United States Patent [19]

Kambara et al.

[11] Patent Number: 4,670,590

[45] Date of Patent: Jun. 2, 1987

[54] PREPARATION PROCESS OF ACRYLAMIDE CRYSTALS

[75] Inventors: Yoshihiko Kambara; Shiro Asano; Wataru Isozaki; Syoji Kitado; Masao Yamaguchi, all of Takaishi, Japan

[73] Assignee: Mitsui Toatsu Chemicals, Incorporated, Tokyo, Japan

[21] Appl. No.: 850,605

[22] Filed: Apr. 11, 1986

[30] Foreign Application Priority Data

Apr. 3, 1985 [JP] Japan .................................. 60-075464
Apr. 24, 1985 [JP] Japan .................................. 60-086591

[51] Int. Cl.$^4$ .......................................... C07C 103/133
[52] U.S. Cl. .................................................... 564/206
[58] Field of Search ........................................ 564/206

[56] References Cited

U.S. PATENT DOCUMENTS

| | | | |
|---|---|---|---|
| 2,771,490 | 11/1956 | Stoddard et al. | 564/206 |
| 3,008,990 | 11/1961 | Weiss | 564/206 |
| 3,549,706 | 12/1970 | Takaki et al. | 564/206 |
| 3,666,809 | 5/1972 | Okuno et al. | 564/206 |
| 3,902,855 | 9/1975 | Lynell | 564/206 X |
| 4,010,142 | 3/1977 | Hurlock et al. | 564/206 |

FOREIGN PATENT DOCUMENTS

| | | | |
|---|---|---|---|
| 51-115410 | 12/1976 | Japan | 564/206 UX |
| 29389 | 5/1979 | Japan | 564/206 UX |

OTHER PUBLICATIONS

Kagaku Kogaku Binran, (Handbook of Chemical Engineering) (1968), p. 437.

Shimpan Hyomen Shori Handbook (Surface Treatment Handbook New Edition) (1969), pp. 110 to 115 and 384 to 389.

*Primary Examiner*—Paul F. Shaver
*Attorney, Agent, or Firm*—Fisher, Christen & Sabol

[57] ABSTRACT

Acrylamide crystals are prepared from an aqueous solution of acrylamide by causing the aqueous solution and a coolant to flow inside each electrolytically-polished cooling tube of a double-walled or shell-and-tube heat exchanger and outside the cooling tube, respectively, instead of relying upon vacuum crystallization.

4 Claims, 2 Drawing Figures

PREPARATION PROCESS OF ACRYLAMIDE CRYSTALS

BACKGROUND OF THE INVENTION

Acrylamide is widely used as the starting monomer for polyacrylamide which has a wide variety of utility such as coagulant and paper-strength agent. It is usually available in the form of aqueous solutions the concentrations of which range from 30 to 50 wt. %. When shipping acrylamide to a distant destination or storing same in a cold district or depending on the application field of acrylamide, it is required to provide acrylamide in its crystalline form.

Crystalline acrylamide is usually produced by concentrating and cooling an aqueous solution of acrylamide to crystallize it out, followed by its filtration and drying. There is a standing demand for the development of not only a proficient concentration technique but also an efficient cooling technique.

If one tries to cool an aqueous solution of acrylamide to crystallize out the acrylamide by using a heat exchanger equipped with conventional cooling means such as coil, jacket or the like, scale of acrylamide crystals is caused to deposit on the cooling surfaces and the quantity of transferable heat is reduced extremely, thereby inhibiting efficient cooling and crystallization.

In order to overcome the above-mentioned problem, the vacuum crystallization process has heretofore been employed principally so that an aqueous solution of acrylamide is depressurized to have its water evaporate, thereby taking its latent heat of vaporization from the solution and hence cooling the thus-concentrated solution and causing the acrylamide to crystallize out (see, for example, Japanese Patent Laid-Open No. 115410/1976).

In an investigation conducted by the present inventors, crystallization under the usual conditions proposed in Japanese Patent Laid-Open No. 115410/1976, namely, at a temperature of 5° C., a pressure of 5-6 torr and an oxygen partial pressure as low as 0.25 torr encountered such serious problems that the polymerization of acrylamide was not successfully prevented and the resultant polymer plugged the crystallizer and/or was allowed to mix in the intended final product, i.e., acrylamide crystals. The crystallizer is a vacuum apparatus and hence requires a substantial initial cost. It has also been found that the operation is very cumbersome.

With the foregoing in view, it came to the positive attention of the present inventors that these problems could be solved if a cooling and crystallization process making use of a heat exchanger may be used in place of the vacuum crystallization process.

For example, according to "Kagaku Kogaku Binran (Handbook of Chemical Engineering)", revised 3rd edition, page 437 (1968) published by Maruzen Co., Ltd., Tokyo, Japan, it is indicated to be effective for the prevention of scale deposition in apparatus and circulation systems to improve the surface finishing of each cooling surface to reduce its surface roughness, to apply a lining to each cooling surface with an organic material or the like.

According to an investigation conducted by the present inventors, no additional effects were however observed for the prevention of scale deposition even when the surface roughness $R_{max}$ of each sample surface, as measured by JIS B-0601-1982 or ISO R 468-1966 for instance, was improved to $0.9\mu$ or so by the so-called buffing as described, for example, in "Shimpan Hyomen Shori Handbook (Surface Treatment Handbook, New Edition)", page 110-115 (1969) published by The Sangyo Tosho Kabushiki Kaisha, Tokyo, Japan, namely, by finishing the surface successively, for example, with #100, #150, #300 and #400 abrasives while using paper buff and then loose buff, and finally mirror-finishing the surface with green rouge. The term "$R_{max}$" as used herein means the distance between the top and bottom of a rough area in the surface of a material as expressed in terms of micrometer ($\mu$m) as shown in the accompanying drawings, which will be described later in this specification. It has hence been found that the deposition of scale cannot always be prevented even if the surface roughness is reduced.

Regarding the prevention of polymer deposition on the inner wall of a polymerization tank for vinyl chloride or its analogous monomer, Japanese Patent Laid-Open No. 29389/1979 discloses to polish the inner wall mechanically with buff of #400 or more precise and then to mirror finish the thus-polished inner wall with an abrasive compound such as finishing green rouge; or to polish the inner wall mechanically with buff of #300 or greater and then to subject the thus-polished inner wall to electrolytic polishing in order to mirror finish same. Namely, the above process intends to prevent the deposition of the resultant polymer by reducing the surface roughness of the inner wall through its buffing or the like. Electrolytic polishing is employed as one of means for achieving that goal.

Turning finally to the application of a lining or the like with an organic material, no effects were observed at all when phenol resins were coated. Even when a fluoroplastic lining was applied, it was impossible to prevent the deposition of scale sufficiently. Moreover, such a lining has a small heat transfer coefficient and a very large cooling area is therefore required. Use of such a lining raises certain problems in manufacturing a heat exchanger.

SUMMARY OF THE INVENTION

An object of this invention is to provide a cooling and crystallization process making use of a double-walled or shell-and-tube heat exchanger as a substitute process for the conventionally-practised preparation process of acrylamide crystals by vacuum crystallization.

Another object of this invention is form a cooling surface, which is free from deposition of scale of acrylamide crystals, on the inner wall of each cooling tube by electrolytic polishing.

The above objects of this invention can be achieved by the following process:

In a process for preparing acrylamide crystals from an aqueous solution of acrylamide by cooling the solution and crystallizing out the acrylamide, the improvement wherein said process makes use of a double-walled or shell-and-tube heat exchanger equipped with one or more stainless steel cooling tubes with the inner walls thereof polished electrolytically, and the solution and a coolant are caused to flow inside and outside said one or more cooling tubes respectively.

The above preparation process of acrylamide crystals makes use of the double-walled or shell-and-tube heat exchanger. It is thus possible to increase the flow velocity of the aqueous acrylamide solution along the cooling surfaces of the cooling tubes and hence to prevent deposition of scale on the cooling surfaces. If the cooling should be effected by using a heat exchanger of the coil type, jacket type or the like in a crystallization tank, the aqueous acrylamide solution is prone to stagnation, thereby making it difficult to avoid the deposition of scale. The process of this invention is however free of such a problem.

Unlike the conventionally-known deposition of the polymer on the inner wall of the polymerization tank for vinyl chloride or its analogous monomer, it is not absolutely necessary to reduce the surface roughness of the inner wall of each cooling tube in the present invention. For example, sufficient preventive effects against deposition of scale can still be obtained even when each cooling tube has been subjected to electrolytic polishing without buffing same or after buffing it with coarse buff of #150 or so and the surface roughness of the thus-polished inner wall of the cooling tube is on the order of 2–3 μm in terms of $R_{max}$.

Although it has not been fully elucidated why electrolytic polishing is so effective for the prevention of scale deposition, electrolytic polishing seems to change the surface condition of the metal in a way effective for the prevention of scaling of acrylamide crystals.

Unlike vacuum crystallization which has conventionally been employed, the process of this invention is free from the formation of acrylamide polymer and the admixture of acrylamide polymer in acrylamide crystals. Moreover, the process of this invention permits prevention of the deposition of acrylamide crystals as scale on the cooling surfaces upon cooling an aqueous solution of acrylamide and hence crystallizing out the acrylamide, although the prevention of such scale deposition has been considered to be difficult so far. The process of this invention can hence maintain a high cooling efficiency and permits commercial production of acrylamide crystals by the simple and economical cooling and crystallization technique.

DETAILED DESCRIPTION OF THE INVENTION

Figure 1:
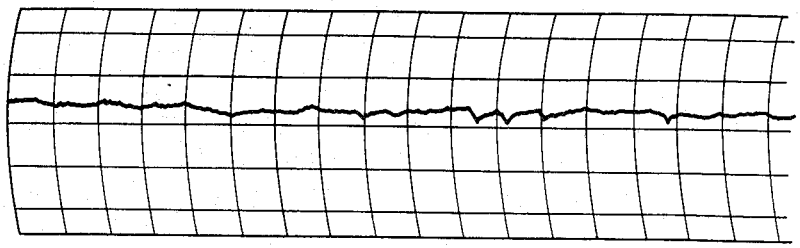
FIG. 1 and FIG. 2 show, by way of example, the profiles of the inner walls of cooling tubes employed respectively in Experiment Nos. 1 and 2 of Example 1 directed to the process of this invention.

Vacuum crystallization has been primarily employed to date upon preparation of acrylamide crystals as mentioned above. However, use of the process of this invention has made it possible for the first time to cool an aqueous solution of acrylamide and to crystallize out the acrylamide by means of a cooling apparatus. Its principal features will hereinafter be described.

A double-walled or shell-and-tube heat exchanger made of stainless steel is specifically employed in the present invention. According to the finding and experiences of the present inventors, it is essential to increase the flow velocity of an aqueous solution of a material, which is susceptible to scale deposition such as acrylamide, along the cooling surface in order to cool the solution for the crystallization of the solute. As the type of its cooling apparatus, a double-walled or shell-and-tube heat exchanger is specifically used. The latter is particularly preferred for use because it can provide a particularly large cooling area. For the prevention of scale deposition, a greater flow velocity in each cooling tube may be considered to be more advantageous. It is however impractical to increase the flow velocity excessively in view of problems such as flow resistance in the tubes. Accordingly, the flow velocity may be chosen from a range of 0.3–6 m/sec, preferably, 0.8–4 m/sec.

In the above-mentioned double-walled or shell-and-tube heat exchanger, it is necessary to cause an acrylamide solution to flow inside each cooling tube and to cause a coolant to flow outside each cooling tube, namely, inside the shell for the convenience of application of electrolytic polishing, which will be described later in this specification, and for the readiness of dissolution of scale deposited.

In the present invention, the inner wall of each cooling tube of the double-walled or shell-and-tube heat exchanger is polished electrolytically. By the term "electrolytic polishing or polished electrolytically" as used herein, is meant that a member to be polished is immersed in an electrolyte and its surface is electrochemically polished by using the member itself as an anode and an insoluble metal as a cathode. Electrolytic polishing can be effected, for example, by the method described on page 357 of the above-referred to "Shimpan Hyomen Shori Handbook".

In the present invention, the double-walled or shell-and-tube heat exchanger is fabricated in the following manner.

Stainless steel tubes are employed as cooling tubes. The stainless steel may be any one of austenic stainless steel, martensitic stainless steel and ferrite stainless steel. It is however preferred to use austenic stainless steel such as SUS-304 or SUS-316 for its good availability, machinability and processability.

If the inner diameter of a cooling tube is 15 mm or smaller, it is generally difficult to apply electrolytic polishing to such a thin tube. It is therefore preferred to use cooling tubes the inner diameters of which are greater than 15 mm. When electrolytic polishing is effected, buffing is usually conducted in advance as surface preparation. This buffing is however not essential in the present invention.

As a fabrication sequence, cooling tubes may be individually subjected to electrolytic polishing and then assembled into a double-walled or shell-and-tube heat exchanger. Alternatively, the cooling tubes may first be assembled and then subjected to electrolytic polishing. Both fabrication sequences are usable in the present invention.

The electrolytic polishing of the inner wall of each cooling tube may preferably be conducted in the following manner. For example, a rod-like Cu-Pb cathode is fixed centrally in the tube. By using the cooling tube itself as an anode, the cooling tube is subjected to electrolytic polishing with a current of 0.20–0.40 A/cm² or so while recirculating an electrolyte the composition of which consists, for example, of 45% of phosphoric acid, 35% of sulfuric acid and 3% of chromic acid.

The electrolytic polishing time may generally be about 20–120 minutes, preferably, in a range of 30–90 minutes.

As the aqueous acrylamide solution to which the present invention is applicable, any aqueous acrylamide solution may be used irrespective of its preparation process, including that obtained by the reaction between acrylonitrile and water in the presence of sulfuric acid, by the catalytic hydration process which constitutes the main stream of preparation processes in recent years and causes acrylonitrile and water to react in the presence of a solid catalyst, or by the conversion process with microorganisms of acrylonitrile into acrylamide.

No particular limitation is necessarily imposed on the concentration of acrylamide in an aqueous solution to be fed to a crystallization system. It is generally 40-60 wt. % with a range of 45-55 wt. % being preferred. If the concentration is higher than the upper limit, difficulties are encountered in the prevention of polymerization in the concentration step, purification step and the like. Any concentrations lower than the lower limit result in smaller yields of crystals and moreover require lower coolant temperatures. Accordingly, any concentrations outside the above range are impractical.

The crystallizer in this invention is basically composed, for example, of so-called crystallization tank and cooling apparatus, as well as a pump for circulating the solution between the crystallization tank and cooling apparatus. Acrylamide crystals are formed when an aqueous acrylamide solution, for example, having a concentration within the above range is fed to the above circulation system and is then cooled while circulating the solution between the crystallization tank and the cooling apparatus.

Continuous operation is advantageous for commercial production. Namely, an aqueous acrylamide solution is maintained, for example, at a constant temperature of $-2°$ C.$-+10°$ C. in a crystallization tank so that a portion of the acrylamide is caused to crystallize out so as to convert the solution into a slurry. Then, a predetermined amount of fresh supply of the aqueous acrylamide solution is charged in the crystallization tank and at the same time, a portion of the slurry in the same amount as the fresh supply of the aqueous acrylamide solution is drawn out of the crystallization tank, followed by its delivery to a filtration step which will be described later.

A lower coolant temperature permits use of a smaller cooling area as its advantage. If the temperature difference between the coolant and the acrylamide slurry flowing through a cooling tube becomes greater, the degree of supersaturation of acrylamide increases so high that the prevention of scale deposition is difficult. Accordingly, the temperature of the coolant is usually chosen from a range of $-5°$ C.$-+8°$ C. while paying attention to maintain the temperature difference within $1°$ C.$-7°$ C. or preferably $2°$ C.$-5°$ C.

No particular limitation is necessarily imposed on the flow rate of the coolant. It is generally chosen from a range of flow rates corresponding to overall heat transfer coefficients of 100-700 Kcal/m$^2$·hr·°C., preferably, 300-600 Kcal/m$^2$·hr·°C.

As the coolant, water, a water-methanol mixture, a water-ethylene glycol mixture or the like may be used.

In the present invention, the following conditions may generally be employed upon feeding the aqueous acrylamide solution and coolant to the cooling tubes of the double-walled or shell-and-tube heat exchanger in the preparation process of acrylamide crystals:

| | | |
|---|---|---|
| (a) | Concentration of the aqueous acrylamide solution | 40-60 wt. % |
| (b) | Temperature of the aqueous acrylamide solution at the inlet of the heat exchanger | $-2°$ C.$-+10°$ C. |
| (c) | Flow velocity of the aqueous acrylamide solution through each cooling tube | 0.3-6 m/sec |
| (d) | Temperature of the coolant at the inlet of the heat exchanger | $-5°$ C.$-+8°$ C. |
| (e) | Flow rate of the coolant | Flow rate sufficient to achieve an overall heat transfer coefficient of 100-700 Kcal/m$^2$·hr·°C. in a state where the cooling surface is free of scale deposited. |

The filtration of the thus-obtained acrylamide crystals is carried out, usually, by means of a centrifugal separator, so that the acrylamide crystals are collected. The water content of the resultant acrylamide crystals is then adjusted to about 0.1-2.0 wt. % in the subsequent drying step so as to obtain the intended final product.

In the process of this invention, the degree of electrolytic polishing of the inner wall of each cooling tube may be inspected under such conditions as will be described below in order to ensure that cooling tubes subjected to thorough electrolytic polishing be selectively employed for successful crystallization.

Namely, the inner wall of each cooling tube is electrolytically polished to such a degree that when the acrylamide solution and coolant are caused to flow respectively inside and outside the cooling tube for 1 hour under the following conditions (a)-(e), the total percent of wall areas covered with scale consisting primarily of acrylamide crystals relative to the entire cooling surface of the inner wall of the cooling tube is 30% or less:

| | | |
|---|---|---|
| (a) | Concentration of the aqueous acrylamide solution | 49.0-51.0 wt. % |
| (b) | Temperature of the aqueous acrylamide solution at the inlet of the heat exchanger | 4.5° C.-5.5° C. |
| (c) | Flow velocity of the aqueous acrylamide solution through each cooling tube | 1.3-1.7 m/sec |
| (d) | Temperature of the coolant at the inlet of the heat exchanger | 1.0° C.-2.0° C. |
| (e) | Flow rate of the coolant | Flow rate sufficient to achieve an overall heat transfer coefficient of 300-500 Kcal/m$^2$·hr·°C. in a state where the cooling surface is free of scale deposited. |

EXAMPLES

The present invention will hereinafter be described specifically by the following Examples.

EXAMPLE 1

Five 1-inch tubes (outer diameter: 34.0 mm; inner diameter: 28.4 mm) made of SUS 304 and having a length of 1.5 m were separately subjected at their inner walls to their corresponding surface treatments shown in Table 1.

<Surface treatments of the inner walls of the tubes>

Electrolytic polishing was conducted in the following manner. Each tube to be polished was held upright. An electrolyte tank, a pump and the tube were connected together by pipes in such a way that an electrolyte entered the tube from the bottom thereof and then discharged from the top thereof for its circulation. The electrolyte circulation line is formed into a three-way pipe above the tube, and a rod-like Cu-Pb electrode was inserted through an upper end portion of the three-way pipe. The electrolyte was allowed to return to the electrolyte tank through a horizontal pipe portion of the three-way pipe.

After fixing the thus-inserted rod-like electrode centrally in the tube, the tube was subjected at a current density of 0.30 A/cm$^2$ and 60°-70° C. for a time period specified in Table 1 to electrolytic polishing while circulating an electrolyte, the composition of which consisted of 45 wt. % of phosphoric acid, 35 wt. % of sulfuric acid and 3 wt. % of chromic acid, at a flow velocity of 2 m/sec through the tube.

Buffing was conducted by inserting, through each tube, a shaft provided with so-called paper buff or loose buff and then driving the shaft by a motor. After polishing with abrasives of #100, #150, #300 and #400, the tube was finally subjected to mirror finishing with green rouge.

The tube with a TEFLON (tetrafluoroethylene resin) lining was prepared by Nippon V Company. The resin thickness was 0.5 mm. The phenol-coated tube was prepared by Tokyo N Company. The trade name employed for the treatment was "NC-117". The resin thickness was 0.1-0.2 mm.

<Procedure of evaluation test>

Each of the 1-inch tubes was combined with a hard PVC pipe having an outer diameter of 76 mm and inner diameter of 67 mm to form a cooling apparatus as a double-walled heat exchanger. The cooling apparatus was then connected with a 20-l crystallization tank equipped with a stirrer and cooling jacket, a circulation pump and a flowmeter.

Twenty liters of a 50 wt. % aqueous solution of acrylamide were poured in the crystallization tank. Water of about 2° C. was caused to flow through the jacket of the crystallization tank while scraping off scale of acrylamide crystals deposited on the cooling surface of the jacket, whereby the aqueous solution of acrylamide was cooled to 5° C. and converted into a slurry. The slurry was circulated at 3.8 m$^3$/hr (flow velocity: 1.7 m/sec in the cooling tube), whereas water of 2.0°-2.3° C. was caused to flow at 5.8 m$^3$/hr outside the cooling tube of the cooling apparatus.

In order to maintain the temperature of the slurry at about 5° C., the temperature of the water in the jacket of the crystallization tank was controlled as shown in Table 1. Namely, a higher water temperature in the jacket means greater capacity of the cooling apparatus as the double-walled heat exchanger.

Upon an elapsed time of 1 hour in the above manner, the extent of scale deposition on the inner wall of each cooling tube was observed.

<Results of evaluation test>

Test results are shown in Table 1. Namely, the tube mirror-finished by buffing had a smaller surface roughness but was ineffective for the prevention of scale deposition. On the other hand, the cooling tubes each of which had been subjected to electrolytic polishing were able to prevent the deposition of scale and as understood from the water temperatures in the jacket of the crystallization tank, had greater cooling capacity, although their surface roughness were large. If the effects of electrolytic polishing were insufficient, the preventive effects against the deposition of scale were improved by repeating electrolytic polishing additionally.

Turning next to the tubes with the linings of the organic materials, no sufficient preventive effects against the deposition of scale were observed even with the tube provided with the TEFLON lining, and such effects were not observed at all with the tube coated with the phenol resin.

<Measurement of surface roughness>

In Table 1, each surface roughness was measured by using a feeler-type surface roughness tester, Model SEF-10A manufactured by Kabushiki Kaisha Kosaka Kenkyusho, in accordance with the testing method prescribed in JIS B0651-1976 (see, ISO/R 1880).

Figure 2:
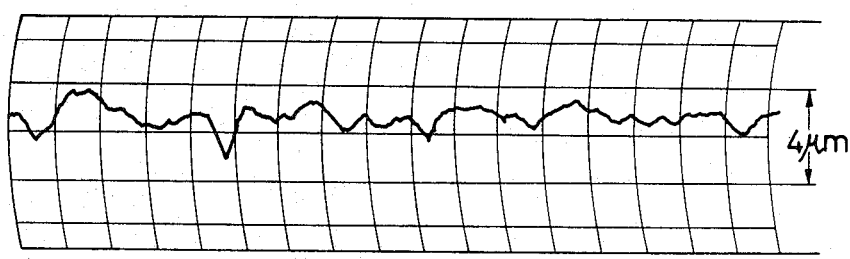

FIGS. 1 and 2 show respectively the surface profiles of the inner walls of the cooling tubes of Experiment Nos. 1 and 2 in Table 1.

In Table 1, each percent of scale-covered area indicates, in terms of percent (%), the ratio of the scale-covered area to the entire cooling area after the passage of the aqueous acrylamide solution for 1 hour. Each jacket water temperature means the temperature of water in the jacket of the crystallization tank, which was required to maintain the slurry temperature at 5° C.

TABLE 1

| Cooling tube No. | Type of surface treatment applied to the inner wall of cooling tube | Surface roughness $R_{max}$ (μ) | Percent of scale-covered area (%) | Water temperature in the jacket of crystallization tank (°C.) |
|---|---|---|---|---|
| 1 | Buffing with #400 buff, followed by mirror-finishing with green rouge. | 0.8 | 100 | 2 |
| 2 | Buffing with #150 buff, followed by electrolytic polishing for 45 minutes. | 2.2 | 0 | 7-9 |
| 3 | Electrolytic polishing only, for 45 minutes. | 3.0 | 40-50 | 5 |
| 3' | Tube No. 3 was subjected to electrolytic polishing for further 30 minutes. | 2.8 | 10% or less | 7-8 |
| 4 | TEFLON coating. | — | 50-60 | 3 |
| 5 | Phenol resin coating. | — | 100 | 2 |

EXAMPLE 2

(1) Fabrication of shell-and-tube heat exchanger

There were provided 28 cooling tubes, each of which was a stainless steel boiler tube (TBSC tube) made of SUS-304 for heat exchangers and having an outer diameter of 31.8 mm, inner diameter of 27.8 mm and length of 2 m. After buffing the inner walls of the cooling tubes with #150 buff, they were assembled into a shell-and-tube heat exchanger.

The associated shell had an inner diameter of 298 mm and six segmental baffles having an cut-off percentage of 35% were arranged at equal intervals on the inner wall of the shell. The tubes were arranged in 4 passes (4 passes × 7 tubes = 28 tubes) with a pitch of 40 mm.

All members, which were brought into contact with an aqueous solution of acrylamide, such as stationary tube sheet and channels, were also made of SUS-304, while the shell was made of SS-41.

(2) Electrolytic polishing

Both upper and lower channel covers of the heat exchanger were removed and adaptors were applied instead. The heat exchanger was held upright, to which an electrolyte tank and a pump were connected in such a way that an electrolyte is allowed to enter the tubes from the bottoms thereof and then to leave out of the tubes for its circulation. The lower adaptor was similar to a lid, whereas the upper adaptor was of an open structure equipped with no lid so as to facilitate the insertion and removal of rod-like electrodes.

Two rod-like Cu-Pb electrodes were inserted respectively in two tubes to be polished. They were fixed centrally in their corresponding tubes and the tubes were polished simultaneously. In this manner, the tubes were polished two after two. In order to allow the electrolyte to flow only through tubes under polishing, the remaining tubes were applied with rubber plugs. Repeating this procedure, each tube was electrolytically polished at a current density of 0.30 A/cm$^2$ and 60°–70° C. for 30 minutes while circulating the electrolyte, the composition of which consisted of 45 wt. % of phosphoric acid, 35 wt. % of sulfuric acid and 3 wt. % of chromic acid, at a flow velocity of about 2 m/sec through the tube.

(3) Cooling and crystallizing operation

An externally-cooled crystallizer was constructed of a 2-m$^3$ crystallization tank equipped with a stirrer and made of SUS-304, the upright shell-and-tube heat exchanger as a cooling apparatus and a pump for circulating the electrolyte between the crystallization tank and cooling apparatus.

The crystallization tank was covered at the outer walls thereof with a heat-insulating material only. Neither cooling jacket nor any other thermo-element was provided with the crystallization tank. A batch-type centrifugal separator was additionally provided to separate crystals from the slurry.

The crystallization tank was charged with 1.5 tons of an aqueous acrylamide solution the temperature and concentration of which were 20° C. and 50 wt. % respectively. The aqueous solution was circulated at a flow rate of 26.8 tons per hour.

The flow velocity of the aqueous acrylamide solution was 1.5 m/sec in each cooling tube. As a coolant, a mixture consisting of 15% of methanol and 85% of water was employed. The flow rate of the coolant was controlled at 5.3 tons per hour.

The temperature of the coolant was gradually lowered in proportion to the temperature drop of the aqueous acrylamide solution in order to maintain the temperature difference between the aqueous acrylamide solution and coolant within 3°–5° C. When the aqueous acrylamide solution turned to a slurry of 5° C. 3 hours later, the temperature of the coolant was controlled to maintain it between 1.5° C. and 2.5° C.

Thereafter, a fresh supply of the 50 wt. % aqueous solution of acrylamide having the temperature of 20° C. was continuously charged at 250–280 kg/hr into the crystallization tank so as to maintain the temperature of the slurry between 4.5° C. and 5.5° C.

At an interval of 20 minutes, the slurry was drawn out of the crystallization tank in substantially the same amount as the fresh supply of the aqueous acrylamide solution, followed by its delivery to the centrifugal separator. The centrifugal separator gave 8–10 kg of wet crystals having a water content of 4–5 wt. %.

In the above manner, the smooth operation was continued over 20 days. During this time, wet crystals was obtained at a rate of about 26–28 kg/hr without any reduction to the quantity of cooling heat transferred.

After completion of the operation, the crystallization system were inspected, led by the crystallization tank. Unlike vacuum crystallization, deposition of polymerized matter was not observed anywhere. In addition, such polymerized matter was not found in the thus-obtained crystals.

EXAMPLE 3

Crystallization was conducted in the same manner as in Example 2 except that the concentration of the starting aqueous acrylamide solution was increased to 55 wt. % and its feed rate was changed to 210 kg/hr.

During the operation over 10 days, wet crystals were obtained at substantially the same rate, namely, at a rate of 40–43 kg/hr.

The crystallization system was inspected after completion of the operation. As a result, no polymerized matter was found similar to Example 2.

EXAMPLE 4

Crystallization was conducted in the same manner as in Example 2 except that the temperature of the coolant was maintained at −1.5°–−0.5° C. and the temperature of the aqueous acrylamide solution was maintained at 3.5°–4.5° C. in the crystallization tank. In order to maintain the temperature of the aqueous acrylamide solution within the range of 3.5–4.5° C. in the crystallization tank, the 50 wt. % aqueous solution of acrylamide was fed at 395 kg/hr. During the operation over 10 days, wet crystals were obtained at substantially the same rate, namely, at a rate of 46–49 kg/hr.

The crystallization system was inspected after completion of the operation. As a result, no polymerized matter was found similar to Example 2.

EXAMPLE 5

In this Example, an exemplary operation was carried out while inspecting the degree of electrolytic polishing.

(1) Fabrication of shell-and-tube heat exchanger

After buffing with #400 buff the inner walls of 56 stainless steel boiler tubes (TBSC tubes) made of SUS-304 for heat exchangers and having an outer diameter of 31.8 mm, inner diameter of 27.8 mm and length of 2 m, there were assembled two shell-and-tube heat exchangers A,B, each, equipped with 28 cooling tubes out of the thus-polished 56 tubes.

The associated shells had an inner diameter of 298 mm and six segmental baffles having an cut-off percentage of 35% were arranged at equal intervals on the inner wall of each of the shells. The tubes were arranged in 4 passes (4 *passes*×7 *tubes*=28 *tubes*) with a pitch of 40 mm.

All members, which were brought into contact with an aqueous solution of acrylamide, such as stationary tube sheet and channels, were also made of SUS-304, while the shells were made of SS-41.

(2) Electrolytic polishing

Both upper and lower channel covers of each of the heat exchanger were removed and adaptors were applied instead. The heat exchanger was held upright, to which an electrolyte tank and a pump were connected in such a way that an electrolyte is allowed to enter the tubes from the bottoms thereof and then to leave out of the tubes for its circulation. The lower adaptor was similar to a lid, whereas the upper adaptor was of an open structure equipped with no lid so as to facilitate the insertion and removal of rod-like electrodes.

Two rod-like Cu-Pb electrodes were inserted respectively in two tubes to be polished. They were fixed centrally in their corresponding tubes and the tubes were polished simultaneously. In this manner, the tubes were polished two after two. In order to allow the electrolyte to flow only through tubes under polishing, the remaining tubes were applied with rubber plugs. Repeating this procedure, each tube was electrolytically polished at a current density of 0.30 A/cm$^2$ and 60°-70° C. for 30 minutes while circulating the electrolyte, the composition of which consisted of 45 wt. % of phosphoric acid, 35 wt. % of sulfuric acid and 3 wt. % of chromic acid, at a flow velocity of about 2 m/sec through the tube.

(3) Inspection of the accuracy of electrolytic polishing

<Preparation for inspection>

An externally-cooled crystallizer was constructed of a 2-m$^3$ crystallization tank equipped with a stirrer and made of SUS-304, the two upright shell-and-tube heat exchangers as cooling apparatus A,B and a pump for circulating the electrolyte between the crystallization tank and cooling apparatus.

The crystallization tank was charged with 1.5 tons of a 50 wt. % aqueous solution of acrylamide (solution temperature: 18° C.). The aqueous solution was circulated at a flow rate of 26.8 tons per hour through the cooling apparatus A. The flow velocity of the aqueous acrylamide solution was 1.5 m/sec in each cooling tube. As a coolant, a mixture consisting of 15% of methanol and 85% of water was employed. The flow rate of the coolant was controlled at 5.3 tons per hour. The temperature of the coolant was gradually lowered in proportion to the temperature drop of the aqueous acrylamide solution in order to maintain the temperature difference between the aqueous acrylamide solution and coolant within 3°-5° C.

When the aqueous acrylamide solution turned to a slurry of 5° C. 3 hours later, the temperature of the coolant was changed to 2.0° C. and the crystallization system was switched over to the cooling apparatus B. The aqueous acrylamide solution which still remained in the cooling apparatus A was purged under pressure by air to the crystallization tank, and the interior of the cooling apparatus A was then washed with water.

<Inspection of the cooling apparatus B>

While maintaining the circulation rate of the acrylamide slurry and the flow rate and temperature of the coolant at the same levels respectively, a fresh supply of the 50 wt. % aqueous solution of acrylamide (solution temperature: 20° C.) was fed to the crystallization tank so as to maintain the temperature of the acrylamide slurry at 5.0° C. In order to maintain the solution level substantially constant in the crystallization tank, the acrylamide slurry was drawn out in the same amount as the thus-fed fresh supply of the aqueous acrylamide solution every 10th minute from the crystallization tank. At this time, the inlet temperature of the cooling apparatus was measured. It was equal to the temperature of the slurry in the crystallization tank, i.e. 5.0° C.

The cooling apparatus B was operated for 1 hour in the above state, followed by a switch-over to the cooling apparatus A. In the beginning, it was necessary to feed the aqueous acrylamide solution at a rate of 280 kg/hr in order to maintain the temperature of the acrylamide slurry at 5.0° C. From the heat balance in this initial state, the overall heat transfer coefficient was determined to be 400 Kcal/m$^2$.hr.°C. Upon an elapsed time of 1 hour, the feed rate of the aqueous acrylamide solution required to maintain the temperature of the acrylamide slurry at 5° C. was however dropped to 220 kg/hr. This drop was an indication of scale deposition. The cooling apparatus was hence disassembled for its inspection. Ten out of the 28 cooling tubes were found to have been covered with scale to extents of 30-80% in terms of percent of scale-covered area. Among the rest of the cooling tubes, two were covered with scale to an extent of 20%, other two were covered with scale to an extent of 10%, and the remaining tubes were substantially free of scale deposit.

<Inspection of the cooling apparatus A>

The cooling apparatus A was operated in the same manner. One hour later, it was stopped and disassembled for its inspection.

During its 1-hour operation, the feed rate of the aqueous acrylamide solution required to maintain the temperature of the acrylamide slurry at 5.0° C. was substantially constant, i.e., 270–280 kg/hr. As a result of the inspection, one of the tubes was covered with scale to an extent of 50% in terms of percent of scale-covered area and another one to an extent of 20%. However, the remaining cooling tubes were substantially free of scale deposit. As a result, it was found that the surface condition of the inner walls of the cooling tubes in the cooling apparatus A was better than that in the cooling apparatus B.

(4) Cooling and crystallizing operation

After disassembly and inspection of the cooling apparatus, the deposited scale was removed and the cooling apparatus were assembled as they had been. A batch-type centrifugal separator was additionally provided in order to separate crystals from the slurry to be drawn out of the crystallization tank.

The temperature of the slurry in the crystallization tank was about 9° C. When the temperature of the slurry had dropped to 5.0° C. subsequent to the initiation of an operation by means of the cooling apparatus A, the operational conditions were changed to the same ones as those employed in the above test and the operation was continued. Besides, the slurry was drawn out every 20th minute, followed by its centrifugation for the separation of crystals.

The feed rate of the 50% aqueous solution of acrylamide was 250-280 kg/hr. The crystals which were obtained by the centrifugation at every 20th minute had a water content of 4-5% and their amount was 8-10 kg. After continuation of this operation for 4 hours, the cooling apparatus was switched over to the cooling apparatus B. Right after the switch-over to the cooling apparatus B, 8-9 kg of wet crystals was obtained by each centrifugation. Four hours later, the yield however dropped to 3 kg or so. The operation was stopped here and the cooling apparatus were again disassembled for their inspection. Out of the 28 cooling tubes in the cooling apparatus A, one cooling tube was plugged due to growth of scale, and another one was covered with scale to an extent of 40% in terms of percent of scale-covered area. The remaining cooling tubes were however substantially free of scale deposit.

Turning next to the cooling apparatus B, 4 cooling tubes were completely plugged, 6 cooling tubes were covered with scale at their entire surfaces, and the rest of the cooling tubes were covered with scale to extents ranging from 0 to 30%.

(5) Electrolytic repolishing of the cooling apparatus B

Since the cooling capacity of the cooling apparatus B was inferior to the cooling apparatus A, 10 out of its cooling tubes, which had been found to be covered with scale to extents in excess of 30% by the inspection method described in the above procedure (3), were subjected again to electrolytic polishing. The electrolytic polishing was conducted for 40 minutes in the same manner as in the above procedure (2).

(6) Reinspection of the accuracy of electrolytic polishing of the cooling apparatus B The reinspection of the cooling apparatus B was conducted in exactly the same manner as in the procedure (3). The percent of scale-covered area after passage of the aqueous acrylamide solution for 1 hour was substantially 0% in the case of the tubes repolished electrolytically. The other tubes were similar to the results obtained above.

(7) Cooling and crystallizing operation

In much the same way as in the above procedure (4), a cooling and crystallizing operation was conducted by using the cooling apparatus A and B. However, the withdrawal and centrifugation of the slurry was conducted at intervals of 1 hour and the frequency of switch-over of the cooling apparatus was 10 hours. After each switch-over, water was caused to flow through the cooling apparatus so that scale was dissolved and washed away.

In the above-described manner, a smooth operation was carried out continuously over 30 days. During this operation, wet crystals were obtained at a rate of about 26-28 kg/hr.

From the material balance during the above operation, the overall heat transfer coefficient of each cooling apparatus was determined. It was 370-400 Kcal/m$^2$.hr.°C.

After completion of the operation, the crystallization system were inspected, led by the crystallization tank. Unlike vacuum crystallization, deposition of polymerized matter was not observed anywhere. In addition, such polymerized matter was not found in the thus-obtained crystals.

We claim:

1. In a process for preparing acrylamide crystals from an aqueous solution of acrylamide by cooling the solution and crystallizing out the acrylamide, the improvement wherein said process makes use of a double-walled or shell-and-tube heat exchanger equipped with one or more stainless steel cooling tubes with the inner walls thereof polished electrolytically, and the solution and a coolant are caused to flow inside and outside said one or more cooling tubes respectively.

2. A process as claimed in claim 1, wherein the crystallization is effected by an externally heat-exchanging crystallizer composed of a cooling apparatus as the double-walled or shell-and-tube heat exchanger, a crystallization tank and a circulation pump.

3. A process as claimed in claim 1, wherein the solution and coolant are caused to flow under the following conditions (a)-(e):

| (a) Concentration of the aqueous acrylamide solution | 40-60 wt. % |
|---|---|
| (b) Temperature of the aqueous acrylamide solution at the inlet of the heat exchanger | −2° C.−+10° C. |
| (c) Flow velocity of the aqueous acrylamide solution through each cooling tube | 0.3-6 m/sec |
| (d) Temperature of the coolant at the inlet of the heat exchanger | −5° C.−+8° C. |
| (e) Flow rate of the coolant | Flow rate sufficient to achieve an overall heat transfer coefficient of 100-700 Kcal/m$^2$ · hr · °C. in a state where the cooling surface is free of scale deposited. |

4. A process as claimed in claim 1, wherein the inner wall of the stainless steel cooling tube has been subjected to electrolytic polishing to such a degree that when the acrylamide solution and coolant are caused to flow respectively inside and outside the cooling tube for 1 hour under the following conditions (a)-(e), the total percent of wall areas covered with scale consisting primarily of acrylamide crystals relative to the entire cooling surface of the inner wall of the cooling tube is 30% or less:

| (a) Concentration of the aqueous acrylamide solution | 49.0-51.0 wt. % |
|---|---|
| (b) Temperature of the aqueous acrylamide solution at the inlet of the heat exchanger | 4.5° C.-5.5° C. |
| (c) Flow velocity of the aqueous acrylamide solution through each cooling tube | 1.3-1.7 m/sec |
| (d) Temperature of the coolant at the inlet of the heat exchanger | 1.0° C.-2.0° C. |
| (e) Flow rate of the coolant | Flow rate sufficient to achieve an overall heat transfer coefficient of 300-500 Kcal/m$^2$ · hr · °C. in a state where the cooling surface is free of scale deposited. |

* * * * *